United States Patent
Rohrig et al.

(10) Patent No.: US 12,214,227 B2
(45) Date of Patent: Feb. 4, 2025

(54) MODULAR PORTABLE MULTI-CREW LIFE SUPPORT SYSTEM

(71) Applicant: Hamilton Sundstrand Corporation, Charlotte, NC (US)

(72) Inventors: Jake Rohrig, Simsbury, CT (US); Robert J. Roy, West Springfield, MA (US); Maria C. Keilich, South Windsor, CT (US); Cory R. Rice, Simsbury, CT (US); Tod A. Lewis, Westfield, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1414 days.

(21) Appl. No.: 16/986,937

(22) Filed: Aug. 6, 2020

(65) Prior Publication Data
US 2022/0040505 A1 Feb. 10, 2022

(51) Int. Cl.
| | | |
|---|---|---|
| *B01D 53/04* | (2006.01) | |
| *A62B 13/00* | (2006.01) | |
| *A62B 15/00* | (2006.01) | |
| *A62B 21/00* | (2006.01) | |
| *A62B 23/04* | (2006.01) | |
| *A62B 25/00* | (2006.01) | |
| *B01D 53/047* | (2006.01) | |

(Continued)

(52) U.S. Cl.
CPC .............. *A62B 13/00* (2013.01); *A62B 15/00* (2013.01); *A62B 21/00* (2013.01); *A62B 23/04* (2013.01); *A62B 25/00* (2013.01); *B01D 53/0473* (2013.01); *B01D 53/261* (2013.01); *B64G 1/52* (2013.01); *B01D 2253/102* (2013.01); *B01D 2253/20* (2013.01); *B01D 2257/504* (2013.01); *B01D 2257/80* (2013.01); *B01D 2259/40007* (2013.01); *B01D 2259/402* (2013.01); *B01D 2259/4575* (2013.01); *B64G 1/525* (2023.08)

(58) Field of Classification Search
CPC ......... A62B 13/00; A62B 15/00; A62B 21/00; A62B 23/04; A62B 25/00; B01D 53/047; B01D 53/26; B64G 1/52
See application file for complete search history.

(56) References Cited

U.S. PATENT DOCUMENTS

| | | | |
|---|---|---|---|
| 3,500,827 A | 3/1970 | O'Reilly et al. | |
| 5,082,471 A * | 1/1992 | Athayde | B01D 53/229 |
| | | | 128/205.28 |

(Continued)

FOREIGN PATENT DOCUMENTS

WO 0064565 A2 11/2000

OTHER PUBLICATIONS

Extended European Search Report for EP Application No. 21185035.9, dated Jan. 10, 2022, pp. 1-6.

*Primary Examiner* — Sharon Pregler
(74) *Attorney, Agent, or Firm* — CANTOR COLBURN LLP

(57) ABSTRACT

A modular, multi-crew life support system and a method of assembling the system involve a fan to draw in ambient air. The system includes one or more assemblies that produce conditioned air from the ambient air, and a housing to support an oxygen source. The system also includes a port configured as an inlet from the oxygen source to augment the conditioned air, and a duct to disperse a result of augmenting the conditioned air as output air to support two or more occupants of an enclosure.

7 Claims, 4 Drawing Sheets

(51) Int. Cl.
*B01D 53/26* (2006.01)
*B64G 1/52* (2006.01)

(56) References Cited

U.S. PATENT DOCUMENTS

| | | |
|---|---|---|
| 10,562,649 B2 | 2/2020 | Gray et al. |
| 2003/0150232 A1 | 8/2003 | Brudnicki |
| 2014/0190483 A1 | 7/2014 | Hansen et al. |
| 2015/0083121 A1* | 3/2015 | Fisher ............... A61M 16/0051 |
| | | 128/205.13 |

* cited by examiner

MODULAR PORTABLE MULTI-CREW LIFE SUPPORT SYSTEM

BACKGROUND

Exemplary embodiments pertain to the art of life support systems and, in particular, to modular, portable, multi-crew life support system.

An environmental control and life support system (ECLSS) refers to regenerative hardware that performs atmosphere revitalization and water recovery to sustain life in an otherwise uninhabitable environment such as a deep space environment, for example. In some phases of a deep space mission, there is no backup life support system if the primary life support system fails.

BRIEF DESCRIPTION

In one embodiment, a modular, multi-crew life support system includes a fan to draw in ambient air, one or more assemblies that produce conditioned air from the ambient air, and a housing to support an oxygen source. A port is configured as an inlet from the oxygen source to augment the conditioned air. The system also includes a duct to disperse a result of augmenting the conditioned air as output air to support two or more occupants of an enclosure.

Additionally or alternatively, in this or other embodiments, the system also includes an oxygen tank disposed in the housing and connected to the port as the oxygen source.

Additionally or alternatively, in this or other embodiments, the system also includes a chemical oxygen generator disposed in the housing and connected to the port as the oxygen source.

Additionally or alternatively, in this or other embodiments, each of the one or more assemblies is a rapid cycle amine (RCA) swing-bed assembly.

Additionally or alternatively, in this or other embodiments, the RCA swing-bed assembly includes an RCA bed and charcoal filter.

Additionally or alternatively, in this or other embodiments, the RCA bed is configured in two portions such that one of the two portions undergoes adsorption to remove carbon dioxide and water vapor from the ambient air while another of the two portions undergoes desorption for regeneration.

Additionally or alternatively, in this or other embodiments, the system also includes a vacuum line configured to expose the other of the two portions of the RCA bed to a deep space environment.

Additionally or alternatively, in this or other embodiments, the system includes two or more of the RCA swing-bed assemblies, and the system also includes a splitter to split the ambient air to each of the two or more of the RCA swing-bed assemblies.

Additionally or alternatively, in this or other embodiments, the system also includes a controller to control a speed of the fan.

Additionally or alternatively, in this or other embodiments, the controller also controls which of the two portions of the RCA bed of each of the one or more RCA swing-bed assemblies is the other portion configured to be regenerated.

In another embodiment, a method of assembling a modular, multi-crew life support system includes disposing a fan to draw in ambient air, positioning one or more assemblies to produce conditioned air from the ambient air, and arranging a housing to support an oxygen source. The method also includes configuring a port as an inlet from the oxygen source to augment the conditioned air, and arranging a duct to disperse a result of augmenting the conditioned air as output air to support two or more occupants of an enclosure.

Additionally or alternatively, in this or other embodiments, the method also includes disposing an oxygen tank in the housing and connecting the oxygen tank to the port as the oxygen source.

Additionally or alternatively, in this or other embodiments, the method also includes disposing a chemical oxygen generator in the housing and connecting the chemical oxygen generator to the port as the oxygen source.

Additionally or alternatively, in this or other embodiments, each of the one or more assemblies is a rapid cycle amine (RCA) swing-bed assembly.

Additionally or alternatively, in this or other embodiments, the RCA swing-bed assembly includes an RCA bed and charcoal filter.

Additionally or alternatively, in this or other embodiments, the RCA bed is configured in two portions such that one of the two portions undergoes adsorption to remove carbon dioxide and water vapor from the ambient air while another of the two portions undergoes desorption for regeneration.

Additionally or alternatively, in this or other embodiments, the method also includes connecting a vacuum line to the one or more RCA swing-bed assemblies to expose the other of the two portions of the RCA bed of each of the one or more RCA swing-bed assemblies to a deep space environment.

Additionally or alternatively, in this or other embodiments, the method also includes configuring a splitter to split the ambient air to each of two or more of the one or more RCA swing-bed assemblies.

Additionally or alternatively, in this or other embodiments, the method also includes configuring a controller to control a speed of the fan.

Additionally or alternatively, in this or other embodiments, the method also includes configuring the controller to also control which of the two portions of the RCA bed of each of the one or more RCA swing-bed assemblies is the other portion configured to be regenerated.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an ECLSS provides life support functionality. While a habitat ECLSS services all the crew members in a deep space vehicle, similar functionality may be provided by an extravehicular mobility unit (EMU) for use by one crew member. The EMU may include primary and secondary oxygen packs, and carbon dioxide and humidity control subsystems, for example. Embodiments of the systems and methods detailed herein pertain to a modular, portable, multi-crew life support system. The modularity refers to the ability to incorporate components from multiple sources, such as the EMU, to build the system, as well as expand its capability for different crew sizes. The portability refers to the fact that, unlike traditional multi-crew life support systems that are fixed in vehicles or habitats, the system, according to one or more embodiments, may be moved and used in different habitats. As a result, the modular, portable, multi-crew life support system may be assembled ad hoc as a life support system in any safe area (e.g., cargo compartment of a deep space vehicle). The modular, portable, multi-crew life support system may be assembled, for example, when the habitat ECLSS is not functioning or when the area with the habitat ECLSS cannot be occupied for any reason. While the deep space application is discussed for explanatory purposes, the modular, portable, multi-crew life support system according to one or more embodiments may be used in any habitat requiring its own independent life support system including an underwater, terrestrial, or subsurface environment.

Figure 1:
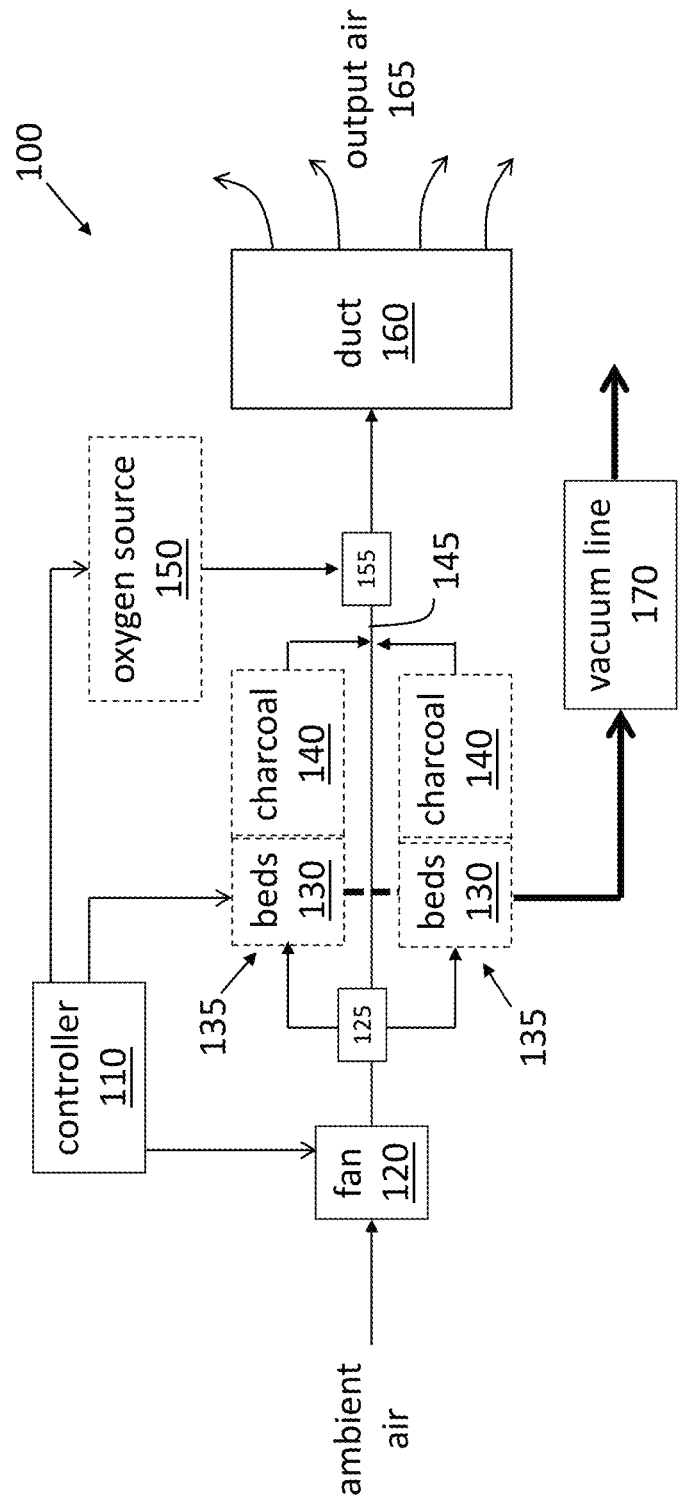
FIG. 1 is a block diagram of a modular, portable, multi-crew life support system according to one or more embodiments.

FIG. 1 is a block diagram of a modular, portable, multi-crew life support system 100 according to one or more embodiments. A fan 120 draws in ambient air to the system 100. The speed of the fan 120 may be controlled by a controller 110 rather than having fixed speed, according to exemplary embodiments. In the exemplary system 100, the air is split at splitter 125 to two Rapid Cycle Amine (RCA) swing-bed assemblies 135 that each include a pair of sorbent beds 130 that remove carbon dioxide and water vapor, as well as a charcoal filter 140. The result of removing the carbon dioxide and water vapor from the air drawn in by the fan 120 is conditioned air 145, as shown in FIG. 1. The operation of the RCA swing-bed assemblies 135 allows regeneration of the sorbent beds 130. Specifically, one bed of each pair of sorbent beds 130 is involved in adsorption, which refers to uptake of carbon dioxide and water vapor from the incoming air, while the other bed of the pair of sorbent beds 130 undergoes desorption or regeneration. Regeneration refers to the solid-amine sorbent bed of the other portion of the RCA bed 130 being exposed to space via a vacuum line 170. The controller 110 may control the initiation and duration of the sorption/regeneration cycle. While two RCA swing-bed assemblies 135 are shown in FIG. 1 according to an exemplary embodiment, one or any number of the RCA swing-bed assemblies 135 may be part of a system 100 according to alternate embodiments.

Figure 2:
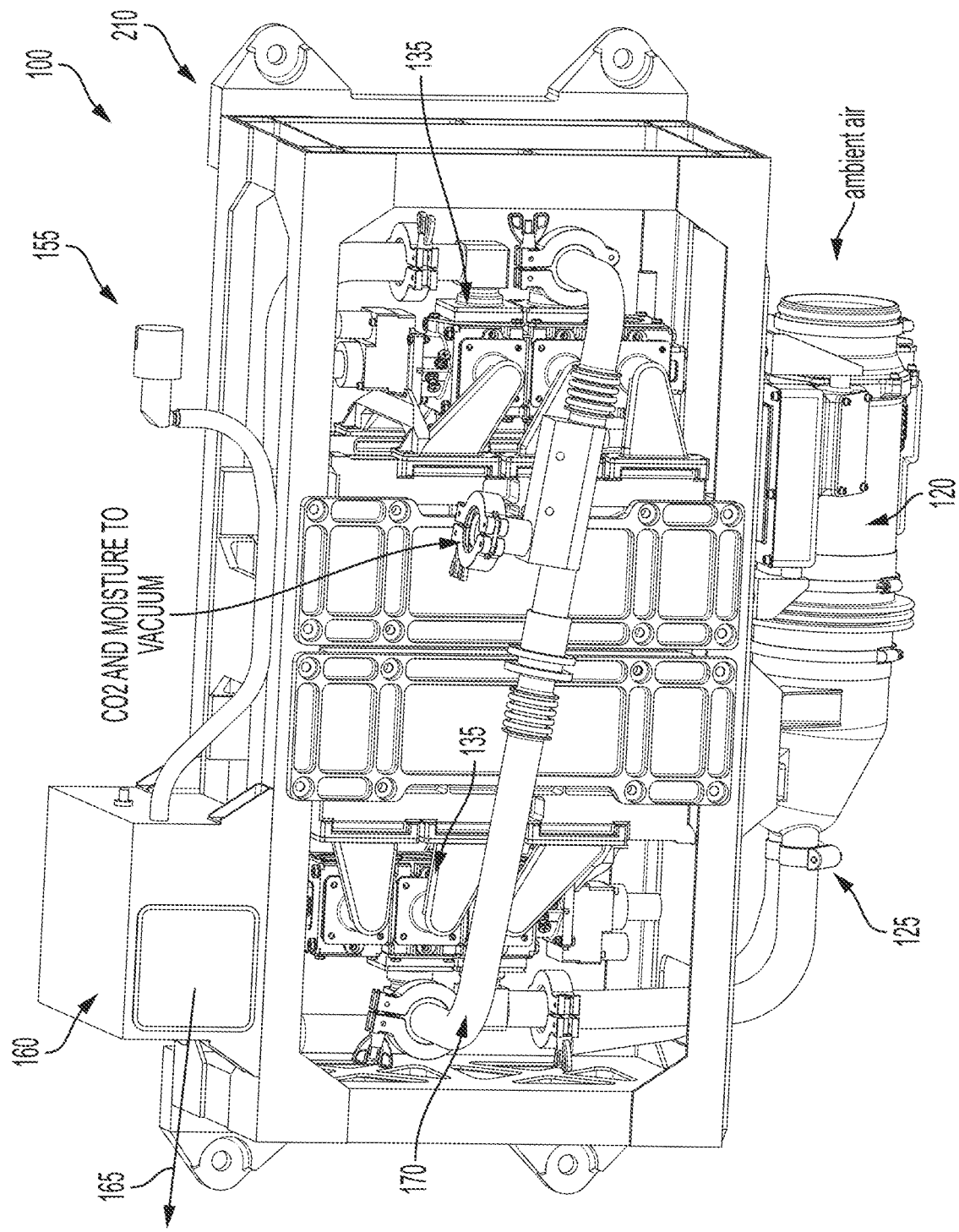
FIG. 2 shows an exemplary modular, portable, multi-crew life support system according to one or more embodiments.

An oxygen source 150 may be attached via a universal attachment port 155 or other quick-connect port. The oxygen source 150 may be an oxygen tank from an EMU, for example, or a chemical oxygen generator. The chemical oxygen generator is a chemical canister that gives off oxygen when ignited. Thus, the burn rate governs the rate of flow of oxygen into the port 155. The controller 110 may control ignition of the chemical oxygen generator or flow rate of the oxygen tank, for example. In FIG. 1, the dashed lines around the RCA swing-bed assemblies 135 and oxygen source 150 indicate that these components may be added ad hoc to the modular system 100. That is, prior to the system 100 being needed, the RCA swing-bed assemblies 135 and the oxygen source 150 may not be part of the basic system 100. As shown in FIG. 2, the basic system 100 includes a mounting structure 210 for the oxygen source 150 prior to full assembly.

Ultimately, the ambient air that has been drawn in by the fan 120, conditioned by the RCA swing-bed assemblies 135, and augmented by the oxygen source 150 is output as output air 165 via a duct 160, which disperses the output air 165. This dispersal via the duct 160 facilitates the multi-crew life support activity even when oxygen tanks from only one EMU, which would typically support only one crew member, are available. By adding one or more RCA swing-bed assemblies 135 and an oxygen source 150 from an EMU, for example, to complete assembly of the system 100, multiple crew members may take shelter in any enclosure.

FIG. 2 shows an exemplary modular, portable, multi-crew life support system 100 according to one or more embodiments. As indicated, ambient air enters an inlet of the fan 120 and is split to two RCA swing-bed assemblies 135. The vacuum line 170 that goes to each of the RCA swing-bed assemblies 135 is shown. A housing 210 to support an oxygen source 150 is indicated, as is the port 155 to introduce the oxygen from the oxygen source 150 to an output of the RCA swing-bed assemblies 135. The duct 160 that disperses output air 165 is also shown.

Figure 3:
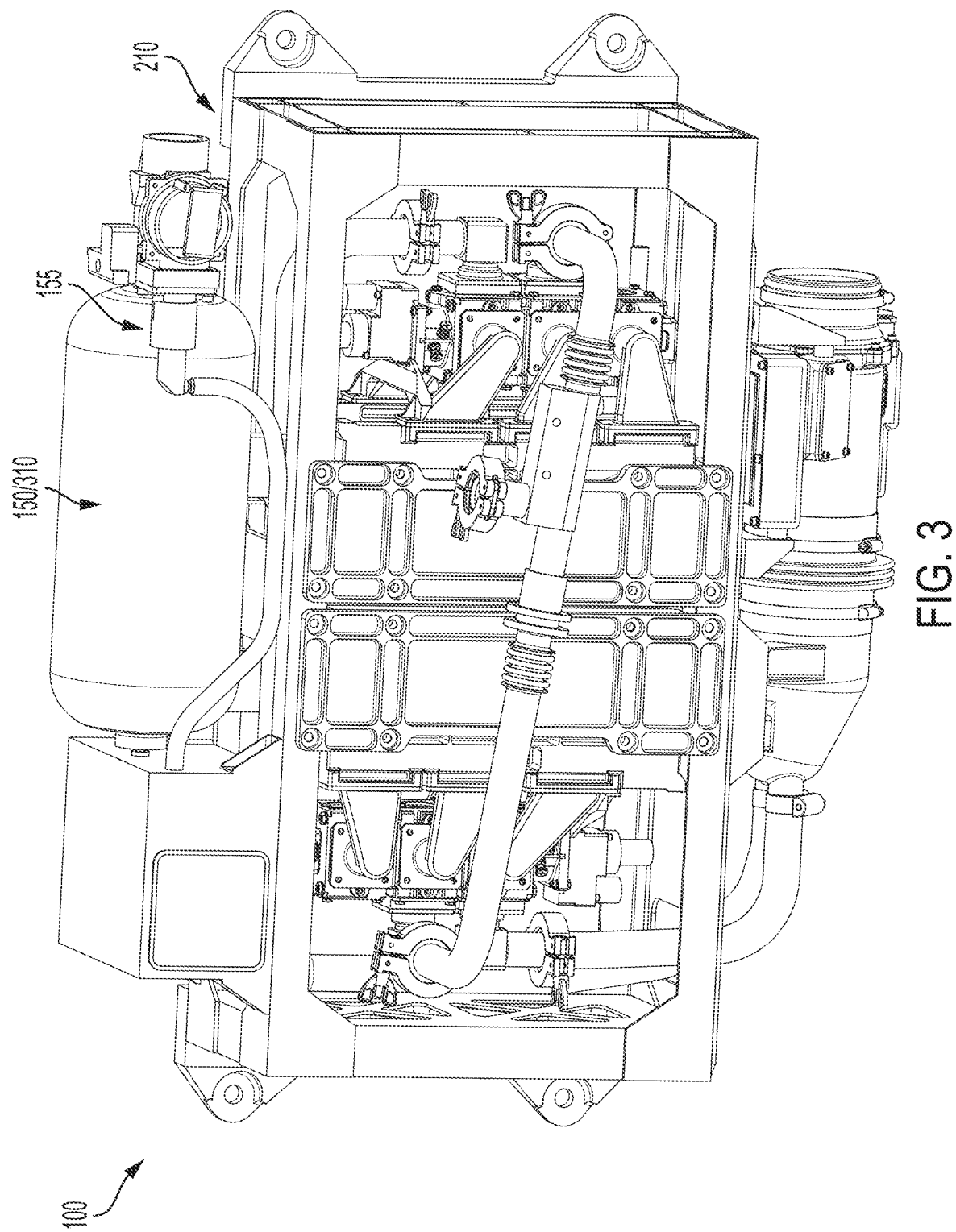
FIG. 3 shows a modular, portable, multi-crew life support system including an oxygen tank according to an exemplary embodiment.
Figure 4:
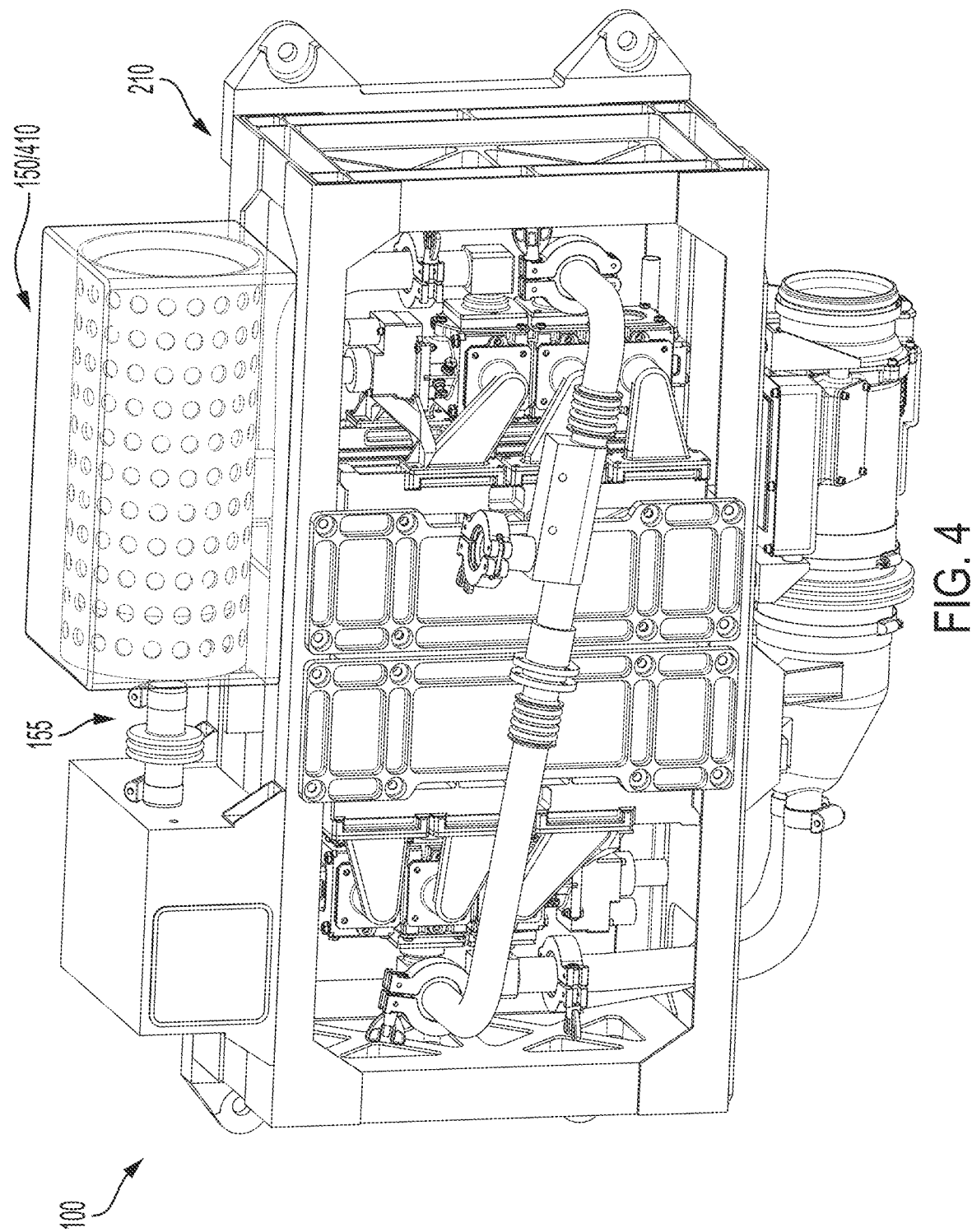
FIG. 4 shows a modular, portable, multi-crew life support system including a chemical oxygen generator according to an exemplary embodiment.

FIGS. 3 and 4 show alternate embodiments of the modular, portable, multi-crew life support system 100. FIG. 3 shows a modular, portable, multi-crew life support system 100 including an oxygen tank 310 according to an exemplary embodiment. The oxygen tank 310 may be obtained from an EMU, for example, and acts as the oxygen source 150 after being placed in the housing 210 and after being connected to the port 155.

FIG. 4 shows a modular, portable, multi-crew life support system 100 including a chemical oxygen generator 410 according to an exemplary embodiment. As previously noted, the chemical oxygen generator 410, which may be referred to as an oxygen candle, is a chemical canister that releases oxygen when ignited. That is, a firing pin, for example, initiates a chemical reaction that is typically exothermic. The oxygen source in the reaction may be an inorganic superoxide, chlorate, or perchlorate, for example. As shown, the chemical oxygen generator 410 acts as the oxygen source 150 after being placed in the housing 210 and being connected to the port 155.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A modular, multi-crew life support system comprising:
a fan configured to draw in ambient air;
one or more assemblies that produce conditioned air from the ambient air, wherein each of the one or more assemblies is a rapid cycle amine (RCA) swing-bed assembly;
a housing configured to support an oxygen source;
a port configured as an inlet from the oxygen source to augment the conditioned air; and
a duct configured to disperse a result of augmenting the conditioned air as output air to support two or more occupants of an enclosure;
wherein the RCA bed is configured in two portions such that one of the two portions undergoes adsorption to remove carbon dioxide and water vapor from the ambient air while another of the two portions undergoes desorption for regeneration;
wherein the system further includes a vacuum line configured to expose the other of the two portions of the RCA bed to a deep space environment.

2. The system according to claim 1, further comprising an oxygen tank disposed in the housing and connected to the port as the oxygen source.

3. The system according to claim 1, further comprising a chemical oxygen generator disposed in the housing and connected to the port as the oxygen source.

4. The system according to claim 1, wherein the RCA swing-bed assembly includes an RCA bed and charcoal filter.

5. The system according to claim 1, wherein the system includes two or more of the RCA swing-bed assemblies, and the system further comprises a splitter configured to split the ambient air to each of the two or more of the RCA swing-bed assemblies.

6. The system according to claim 1, further comprising a controller configured to control a speed of the fan.

7. The system according to claim 6, wherein the controller is also configured to control which of the two portions of the RCA bed of each of the one or more RCA swing-bed assemblies is the other portion configured to be regenerated.

* * * * *